V. PAULITSCH.
POTATO PLANTING MACHINE.
APPLICATION FILED MAY 4, 1909.
955,193.
Patented Apr. 19, 1910.
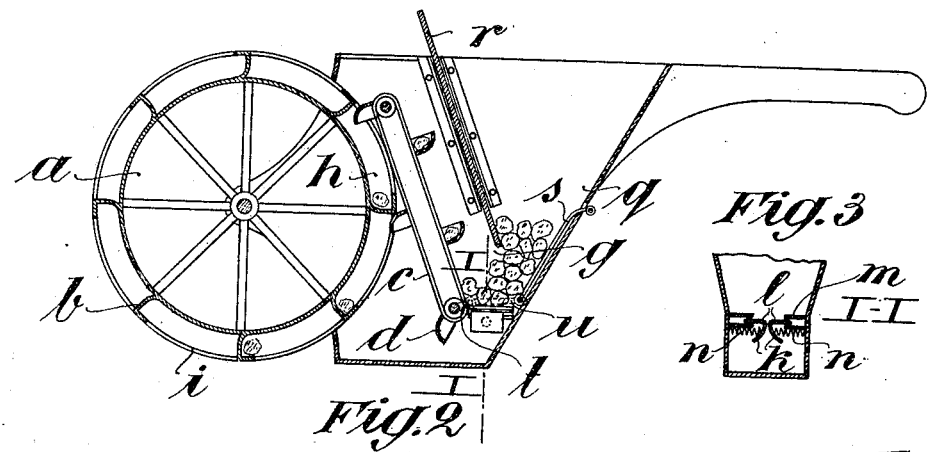
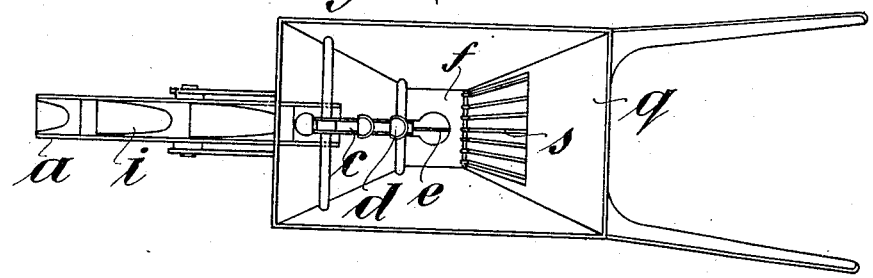
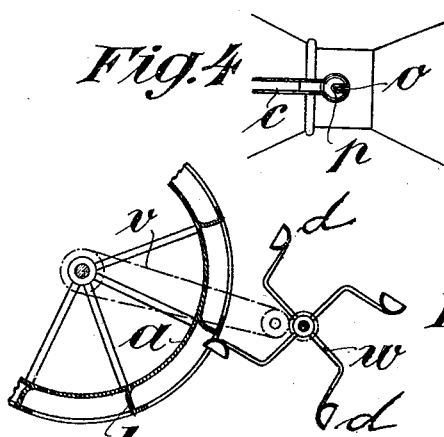
Witnesses
Inventor

UNITED STATES PATENT OFFICE.

VALENTIN PAULITSCH, OF VÖLKERMARKT, AUSTRIA-HUNGARY.

POTATO-PLANTING MACHINE.

955,193. Specification of Letters Patent. Patented Apr. 19, 1910.

Application filed May 4, 1909. Serial No. 493,917.

*To all whom it may concern:*

Be it known that I, VALENTIN PAULITSCH, a subject of the Emperor of Austria-Hungary, residing at Völkermarkt, Austria-Hungary, have invented certain new and useful Improvements in Potato-Planting Machines, of which the following is a specification.

Numerous trials have been made to produce a potato-planting machine which deposits the potatoes automatically and at regular intervals in the furrows. The potato-planting machines of known constructions generally comprise an endless band with buckets which take each one potato from the reservoir and deposit it in the drill-pipe from which the potatoes drop freely into the furrow. It often happens that the potatoes when dropping into the furrow rebound or roll along the furrow so that they are planted quite irregularly. This inconvenience becomes the more apparent the quicker the machine is moved.

The present invention has for its object to improve the construction of the potato planting machine in such a manner that the potatoes are deposited in absolutely regular intervals in the furrows even when the machine is moving forward at a comparatively great speed.

The improved potato-planting machine is shown in the accompanying drawings by way of example in which—

Figure 1 is a longitudinal section. Fig. 2 is a top plan of the machine; Fig. 3 is a section on line 1—1 of Fig. 1. Fig. 4 shows a modified construction of the device which closes the lower end of the potato reservoir. Fig. 5 represents a modified construction of the device for taking the potatoes from the reservoir.

The machine according to the present invention is drawn along the furrows in any suitable manner. At the rear end of the machine the depositing-wheel $a$ is revolubly mounted which has at its periphery curved blades or paddles $b$ which act upon the buckets $d$ of the endless chain $c$ so that said chain is moved in an opposite direction from the wheel. The buckets $d$ are thus forced through the locking-device $e$ of the bottom plate $f$ of the potato-reservoir $g$ where they take one potato which is deposited in the compartment $h$ of the wheel $a$ in which enters the bucket $d$ as soon as it has arrived at the upper end of the endless chain. The compartments $h$ are formed by the paddles $b$ which are curved at the inner end and provided with end parts bent so that they run concentric to the hub of wheel $a$. Said end parts of the paddles which form the outer rim of wheel $a$ have each an opening $i$ which is of circular, angular or elliptical shape and permits, on the one hand, the bucket $d$ to enter the compartment $h$ and, on the other hand, the potato which has been deposited in said compartment to drop out into the furrow as soon as the corresponding part of wheel $a$ has begun the second half of its revolution. All the potatoes are thus deposited in the furrow at uniform distance the one from the other and they drop into the furrow in vertical direction and from such little height that they do not rebound or roll off even if the machine is moving forward at great speed.

The locking device $e$ for the bottom of the potato reservoir consists of two angle-irons $k$ whose horizontal parts $l$ are guided between guide ribs $m$. Springs $n$ serve for pressing the edges of the angle-irons $k$ together so that the opening in the bottom plate $f$ of reservoir $g$ is closed. The buckets $d$ push the angle-irons $k$ back against the action of springs $n$ so that, as soon as a bucket has passed through, the opening is closed again.

Fig. 4 shows a modified construction of the locking-device according to which the opening in the bottom plate $f$ is barred by an arm $o$ which prevents the potatoes from dropping through the opening. In this case the buckets $d$ have each a slot $p$ which slides along said arm $o$ when the bucket passes through the bottom plate $f$. The upper part $q$ of the potato reservoir is separated from the lower part $g$ by means of an adjustable slide $r$ to regulate the amount of potatoes admitted to part $g$.

In order to prevent obstruction of the opening by means of which part $q$ of the potato reservoir communicates with part $g$ movable fingers $s$ are provided which are hinged with one end to the wall of the reservoir and which are intermittently moved up and down by means of a mechanism of convenient known construction which is not particularly shown in the drawings.

In lieu of the endlesss bucket chain I may use, as shown in Fig. 5, revoluble arms $w$ bent at convenient angles and at the free ends of which the buckets $d$ are fixed. Said arms are revolved by means of a chain-gear $v$ from the axle of the depositing-wheel $a$.

The potato-planting machine as hereinbefore described and shown in the drawings is destined to be operated by hand. It can be easily adapted for mechanical power by adding a plow-share mounted below the potato-reservoir $g$, two earth-boards or coverers behind the depositing-wheel $a$ and a plow-beak.

It is advisable to use two endless chains $c$ which are inclined the one toward the other and have the buckets $d$ fixed so that the buckets of one chain are at the middle of the interval between two adjacent buckets of the other chain. Thus a slow motion of the buckets is secured whereby it is insured that each bucket takes one potato.

The device which carries the buckets is preferably mounted so that it can be thrown out of gear with the depositing wheel $a$.

I claim:—

An improved potato-planting machine comprising in combination with the potato-reservoir, a spring influenced trap which closes the bottom end of said reservoir, a bucket chain in said reservoir for lifting the potatoes one by one out of said reservoir, the depositing wheel at the rear end of the machine below the upper end of said bucket chain, curved paddles of said depositing wheel, prolongated front ends of said paddles bent so as to form a second rim of the depositing wheel and having each a longitudinal slot for the admission of the buckets of said chain and through which falls the potato when said part of the wheel begins to ascend from the lowest point of its path, so that the potato drops into the furrow without rebounding, substantially as described and illustrated.

In witness whereof I have hereunto set my hand in the presence of two witnesses.

VALENTIN PAULITSCH.

Witnesses:
HEINRICH SCHELLBACH,
ROBERT W. HEINGARTNER.